(12) United States Patent
Kimura

(10) Patent No.: US 9,483,244 B2
(45) Date of Patent: Nov. 1, 2016

(54) COMPILING METHOD AND COMPILING DEVICE

(71) Applicant: FUJITSU LIMITED, Kawasaki-shi (JP)

(72) Inventor: Shigeru Kimura, Hachiouji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/638,351

(22) Filed: Mar. 4, 2015

(65) Prior Publication Data

US 2015/0331677 A1    Nov. 19, 2015

(30) Foreign Application Priority Data

May 15, 2014  (JP) ................. 2014-101654

(51) Int. Cl.
*G06F 9/45* (2006.01)
*G06F 12/08* (2016.01)

(52) U.S. Cl.
CPC ............ *G06F 8/4442* (2013.01); *G06F 8/41* (2013.01); *G06F 12/0862* (2013.01); *G06F 12/0875* (2013.01); *G06F 2212/453* (2013.01)

(58) Field of Classification Search
CPC . G06F 8/41; G06F 2212/453; G06F 12/0875
USPC ....................................................... 717/148
See application file for complete search history.

(56) References Cited

U.S. PATENT DOCUMENTS

| | | | |
|---|---|---|---|
| 9,190,124 B2 * | 11/2015 | Fanning | ........... G11C 16/00 |
| 2002/0144062 A1 | 10/2002 | Nakamura | |
| 2009/0132733 A1 | 5/2009 | Codrescu | |
| 2009/0216956 A1 * | 8/2009 | Ekanadham | ........ G06F 12/0862 711/137 |
| 2009/0240887 A1 | 9/2009 | Okawara | |

FOREIGN PATENT DOCUMENTS

| | | |
|---|---|---|
| JP | 2001-166989 | 6/2001 |
| JP | 2002-297379 | 10/2002 |
| JP | 2006-330813 | 12/2006 |
| JP | 2009-230374 | 10/2009 |
| JP | 2010-244204 | 10/2010 |
| JP | 2011-504274 | 2/2011 |
| JP | 2011-81836 | 4/2011 |
| WO | 2009/067525 | 5/2009 |

* cited by examiner

*Primary Examiner* — John Chavis
(74) *Attorney, Agent, or Firm* — Staas & Halsey LLP

(57) ABSTRACT

A computer converts a source program into intermediate code. The computer detects, based on profile information related to a memory access for accessing target data stored in a memory, a memory access that fits an access pattern corresponding to an operating condition of a hardware prefetch function for the target data. The target data is data for which a prefetch instruction is to be inserted in advance. The prefetch instruction is an instruction for transferring data stored in the memory to a cache memory. The computer computes an evaluation value for the target data based on a length of successive memory accesses that fit the access pattern, and determines, based on the evaluation value, whether to suppress insertion of a prefetch instruction for the target data. The computer updates the intermediate code based on a result of the determination, and converts the updated intermediate code into a machine language program.

15 Claims, 11 Drawing Sheets

FIG. 9

TABL1

| ELEMENT NUMBER i | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| CACHE LINE NUMBER CL | 0 | 1 | 2 | 3 | 22 | 33 | 44 | 45 | 55 | 56 | 66 | 67 | 68 | 69 | 70 | 88 |
| ACCESS ATTRIBUTE Z | S | S | S | S | X | X | X | S | X | S | X | S | S | S | S | X |

ARRAY DATA A

L=3, L=1, L=1, L=4

TABL2

| SUCCESSION LENGTH L | OCCURRENCE FREQUENCY c |
|---|---|
| 0 | 6 |
| 1 | 2 |
| 2 | 0 |
| 3 | 1 |
| 4 | 1 |
| 5 | 0 |
| ... | ... |
| 15 | 0 |

COMPILING METHOD AND COMPILING DEVICE

CROSS-REFERENCE TO RELATED APPLICATION

This application is based upon and claims the benefit of priority of the prior Japanese Patent Application No. 2014-101654, filed on May 15, 2014, the entire contents of which are incorporated herein by reference.

FIELD

The embodiment discussed herein is related to a compiling method and a compiling device.

BACKGROUND

A compiling device, for example, performs a compilation process for converting a source program into a machine language program that is executable by an arithmetic processing device such as a processor and the like. The arithmetic processing device, for example, includes a decoding unit, an arithmetic unit, and a cache memory. The decoding unit decodes instructions included in the machine language program generated through the compilation process. The arithmetic unit performs arithmetic operations based on the decoded instructions. The cache memory is arranged between the arithmetic unit and a main memory that is a main storage device. The arithmetic unit, for example, performs arithmetic operations by referring to data stored in the main memory or the cache memory. The cache memory, for example, stores data that is referred to by the arithmetic unit.

The arithmetic processing device, for example, may shorten a waiting time for reference of data by referring to data stored in the cache memory when compared with referring to data stored in the main memory. A hit rate of the cache memory decreases in a numerical calculation process that uses large-scale data such as an array and the like because data locality is low. In this case, the effect of shortening the waiting time for reference of data is small since the cache memory is not effectively used.

As a measure for remedying a decrease in the hit rate of the cache memory, for example, a prefetch is used to transfer data stored in the main memory to the cache memory in advance. Examples of a method for realizing the prefetch include a software prefetch realized by software and a hardware prefetch realized by hardware.

In the software prefetch, for example, the compiling device inserts an instruction (also referred to as a prefetch instruction hereinafter) to transfer data stored in the main memory to the cache memory in advance into the machine language program. In the hardware prefetch, hardware such as a hardware prefetch mechanism and the like is disposed inside the arithmetic processing device. For example, when it is determined that an access to a continuous memory is performed, the hardware prefetch mechanism predicts data that is accessed next and transfers the data stored in the main memory to the cache memory in advance.

In an arithmetic processing device that includes the hardware prefetch mechanism, for example, performance of the arithmetic processing device may be degraded even though the software prefetch is applied. For example, there may be a case where both of a prefetch by the hardware prefetch mechanism and the prefetch by a prefetch instruction are performed for data at the same address. That is to say, an unnecessary prefetch instruction may be inserted into the machine language program. In this case, for example, performance degradation such as an increase in the number of instructions, a decrease in the process efficiency of scheduling, a decrease in the transfer speed due to an increase in the amount of consumption of a bus, and the like may be caused.

For this reason, a technology has been proposed to efficiently achieve a balance between the hardware prefetch and the software prefetch and to improve the performance of the arithmetic processing device. For example, a memory access instruction added with indicative information, which indicates whether the memory access instruction is a target of the hardware prefetch, is used in this type of an arithmetic processing device. In the compilation process, for example, a memory access instruction added with the indicative information is generated when memory access instructions for accessing a continuous memory are detected.

For this reason, the arithmetic processing device, for example, includes a decoding unit capable of decoding a memory access instruction added with indicative information and an arithmetic unit capable of executing the memory access instruction added with the indicative information. Furthermore, the arithmetic processing device includes a hardware prefetch mechanism compliant with the memory access instruction added with the indicative information. For example, the hardware prefetch is suppressed when the indicative information indicates that the memory access instruction is not a target of the hardware prefetch.

Related techniques are disclosed in, for example, Japanese Laid-open Patent Publication No. 2009-230374, Japanese National Publication of International Patent Application No. 2011-504274, Japanese Laid-open Patent Publication No. 2010-244204, Japanese Laid-open Patent Publication No. 2006-330813, Japanese Laid-open Patent Publication No. 2011-81836, Japanese Laid-open Patent Publication No. 2002-297379, and Japanese Laid-open Patent Publication No. 2001-166989.

When a software prefetch is applied to an arithmetic processing device that includes a hardware prefetch mechanism, for example, an unnecessary prefetch instruction may be inserted into the machine language program. This may cause degradation of performance of the arithmetic processing device. The compiling method that generates a memory access instruction added with indicative information, which indicates whether the memory access instruction is a target of the hardware prefetch, has a less versatility. For example, in the compiling method that generates a memory access instruction added with the indicative information, the performance of the arithmetic processing device may be degraded when the decoding unit, the arithmetic unit, and the hardware prefetch mechanism are not compliant with the memory access instruction added with the indicative information.

SUMMARY

According to an aspect of the present invention, provided is a compiling method. In the compiling method, a computer converts a source program into intermediate code. The computer detects, on the basis of profile information related to a memory access for accessing target data stored in a memory, a memory access that fits an access pattern corresponding to an operating condition of a hardware prefetch function for the target data. The target data is data for which a prefetch instruction is to be inserted in advance. The prefetch instruction is an instruction for transferring data stored in the memory to a cache memory. The computer computes an evaluation value for the target data on the basis of a length of successive memory accesses that fit the access pattern. The computer determines, on the basis of the evaluation value, whether to suppress insertion of a prefetch instruction for the target data. The computer updates the intermediate code on the basis of a result of the determination. The computer converts the updated intermediate code into a machine language program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating examples of the access attribute table and a succession length management table;

DESCRIPTION OF EMBODIMENT

Hereinafter, an embodiment will be described with reference to the drawings.

Figure 1:
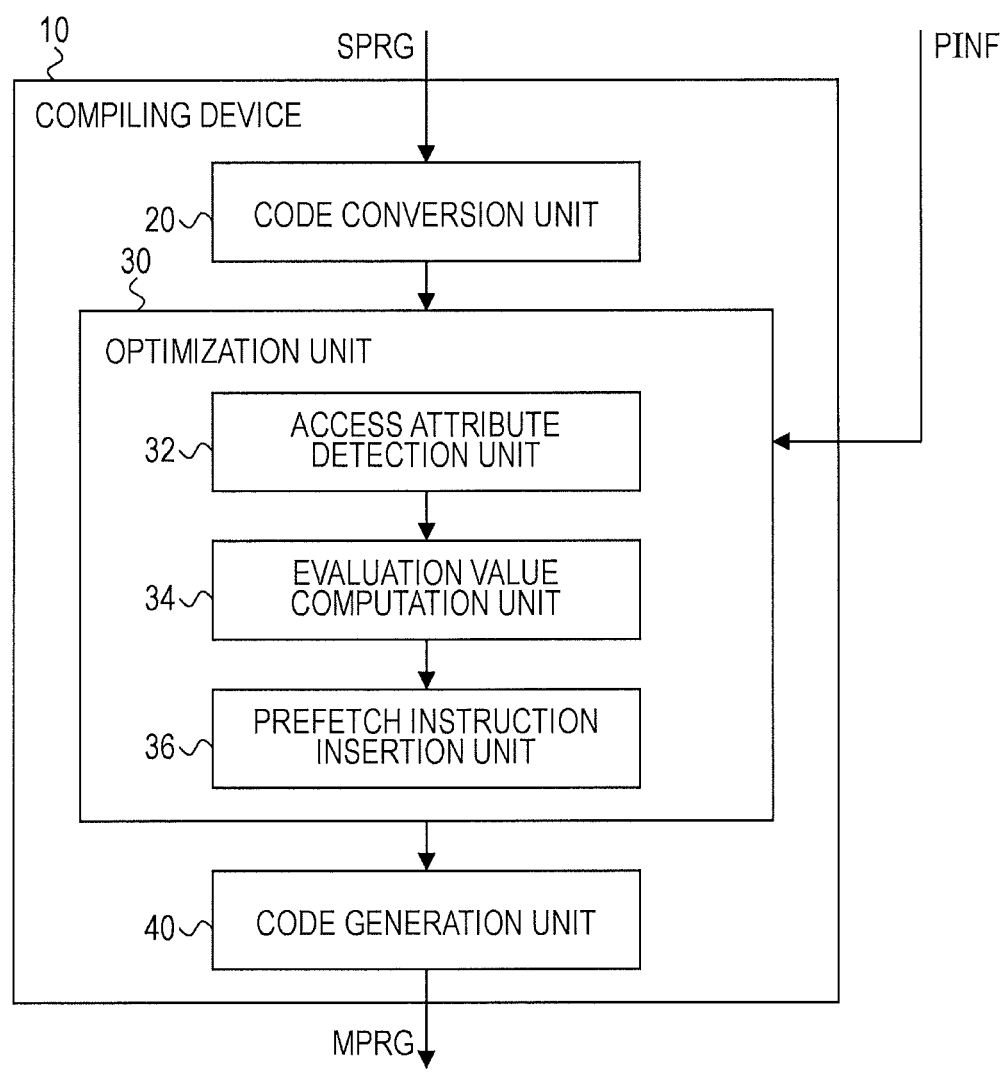
FIG. 1 is a diagram illustrating a compiling device according to an embodiment.

FIG. 1 illustrates a compiling device according to the present embodiment. A compiling device 10 according to the present embodiment may be realized only by hardware or may be realized by hardware under control of software. For example, the compiling device 10 may be realized by a computer that executes a compilation program.

The compiling device 10, for example, performs a compilation process for converting a source program into a machine language program. The machine language program is executable by a processor having a hardware prefetch function of transferring data stored in a main memory, which is a main storage device, to a cache memory in advance. The compiling device 10, for example, receives a source program SPRG and profile information PINF to output a machine language program MPRG.

The profile information PINF, for example, is information related to a memory access for accessing target data. The target data is data for which a prefetch instruction for transferring data stored in the main memory to the cache memory is to be inserted in advance. A prefetch instruction is inserted into the machine language program MPRG when a software prefetch is performed through the compilation process. A prefetch instruction may be realized by an instruction for loading data or may be realized by an instruction dedicated to a prefetch.

The target data, for example, is array data (referred to as indirectly accessed array data) that is accessed indirectly. An access destination in the indirectly accessed array data is determined when the arithmetic processing device such as the processor and the like executes the source program. For this reason, it is difficult, by using hardware, to predict in advance an access destination of the indirectly accessed array data. Therefore, performing the software prefetch for the indirectly accessed array data improves performance of the arithmetic processing device.

The hardware prefetch may be performed when an access destination of the indirectly accessed array data changes regularly. The hardware prefetch, for example, is performed by a hardware prefetch control device 140 of an arithmetic processing device 100 illustrated in FIG. 3. The performance of the arithmetic processing device may be degraded by performing the software prefetch when the hardware prefetch is performed. For this reason, the compiling device 10 determines whether an access destination of the indirectly accessed array data changes regularly on the basis of the profile information PINF and determines whether to suppress insertion of a prefetch instruction on the basis of the determination result.

The target data is not limited to indirectly accessed array data. For example, the target data may be data that is accessed by a pointer variable. Also in the case of an access by a pointer variable, an access destination, for example, is determined when the arithmetic processing device executes the source program. Hereinafter, an irregular memory access of which the access destination is determined when the arithmetic processing device executes the source program is also referred to as an irregular indirect memory access. In addition, data for which the irregular indirect memory access is performed is also referred to as irregularly and indirectly accessed data.

That is to say, the compiling device 10 may set the data for which the irregular indirect memory access is performed as the target data, not limiting the target to the indirectly accessed array data and the data that is accessed by a pointer variable. Hereinafter, the target data will be described as the indirectly accessed array data.

The compiling device 10, for example, includes a code conversion unit 20, an optimization unit 30, and a code generation unit 40. The code conversion unit 20 is an example of a conversion unit that converts the source program into intermediate code. The code conversion unit 20, for example, receives the source program SPRG and converts source code of the source program SPRG into intermediate code. The intermediate code generated by the code conversion unit 20 is transferred to the optimization unit 30.

The optimization unit 30 is an example of an optimization unit that updates the intermediate code. The optimization unit 30, for example, receives the intermediate code and the profile information PINF and optimizes the intermediate code. The intermediate code optimized by the optimization unit 30 is transferred to the code generation unit 40. Whether to insert a prefetch instruction into the machine language program MPRG is determined when the intermediate code is optimized.

The optimization unit 30, for example, includes an access attribute detection unit 32, an evaluation value computation unit 34, and a prefetch instruction insertion unit 36. The access attribute detection unit 32 is an example of a detection unit that detects, from among memory accesses for accessing the target data, a memory access that fits a predetermined access pattern on the basis of the profile information of the target data related to a memory access. The predetermined access pattern, for example, is an access pattern corresponding to an operating condition of the hardware prefetch function.

For example, the access attribute detection unit 32 detects, on the basis of the profile information PINF, a memory access (referred to as a memory access of a predetermined access pattern) that fits the predetermined access pattern, from among pieces of data in the array data that is repeatedly accessed through a loop process. Then, the access attribute detection unit 32 generates information (also referred to as an access attribute table hereinafter) that includes an access attribute indicating whether the memory access fits the predetermined access pattern. The access attribute table generated by the access attribute detection unit 32 is transferred to the evaluation value computation unit 34.

The evaluation value computation unit 34 is an example of a computation unit that computes an evaluation value for target data on the basis of the length of successive memory accesses that fit the predetermined access pattern. The evaluation value computation unit 34, for example, receives the access attribute table generated by the access attribute detection unit 32. Then, the evaluation value computation unit 34 computes an evaluation value for target data on the basis of the access attribute included in the access attribute table. The evaluation value computation unit 34, for example, computes the length (also referred to as a succession length hereinafter) of successive memory accesses that fit the predetermined access pattern. Then, the evaluation value computation unit 34 computes an evaluation value for target data on the basis of the succession length. The evaluation value computed by the evaluation value computation unit 34 is transferred to the prefetch instruction insertion unit 36.

The prefetch instruction insertion unit 36 is an example of an update unit that determines whether to suppress insertion of a prefetch instruction for target data on the basis of the evaluation value and updates the intermediate code on the basis of the determination result. The prefetch instruction insertion unit 36, for example, receives the evaluation value computed by the evaluation value computation unit 34. Then, the prefetch instruction insertion unit 36 determines whether to suppress insertion of a prefetch instruction for each target data on the basis of the evaluation value and updates the intermediate code on the basis of the determination result.

The prefetch instruction insertion unit 36 updates the intermediate code, for example, by inserting a prefetch instruction for target data having an evaluation value smaller than a predetermined threshold, and suppressing insertion of a prefetch instruction regarding target data having an evaluation value greater than or equal to the threshold. Accordingly, the intermediate code, for example, is optimized. The intermediate code optimized by the prefetch instruction insertion unit 36 is transferred to the code generation unit 40.

The code generation unit 40 is an example of a code generation unit that converts the updated intermediate code into a machine language program. The code generation unit 40, for example, receives the intermediate code updated by the prefetch instruction insertion unit 36. Then, the code generation unit 40 converts the intermediate code updated by the prefetch instruction insertion unit 36 into the machine language program MPRG.

In this manner, the compiling device 10 may generate the machine language program MPRG which is executable by a processor having a hardware prefetch function and into which insertion of unnecessary prefetch instructions are reduced. That is to say, the compiling device 10 may reduce insertion of unnecessary prefetch instructions when prefetch instructions are inserted into the machine language program MPRG through the compilation process.

Figure 2:
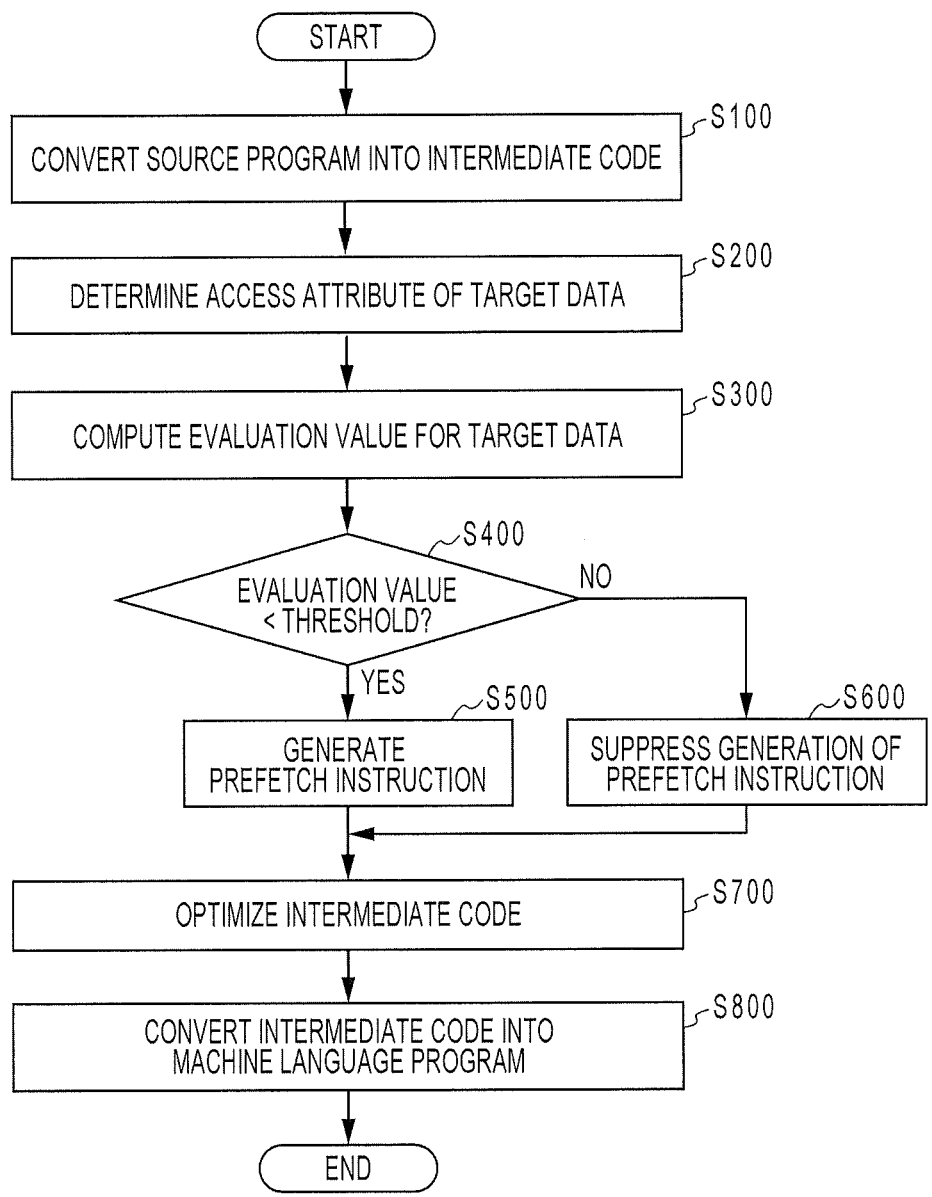
FIG. 2 is a flowchart illustrating an example of the operation of the compiling device.

FIG. 2 illustrates an example of an operation of the compiling device 10 illustrated in FIG. 1. The operation illustrated in FIG. 2 may be realized only by hardware or may be realized by hardware under control of software. For example, a computer may read a compilation program recorded in a storage medium to perform the operation illustrated in FIG. 2. In other words, the compilation program may cause the computer to perform the operation illustrated in FIG. 2.

In the operation illustrated in FIG. 2, the profile information PINF is generated before S100 is performed. The profile information PINF, for example, may be generated by the compiling device 10 or may be generated by a compiling device different from the compiling device 10.

In S100, the code conversion unit 20 converts a source program into intermediate code.

In S200, the access attribute detection unit 32 determines an access attribute of target data, for which an irregular memory access is performed, on the basis of the profile information PINF related to a memory access for accessing data. For example, the access attribute detection unit 32 detects, on the basis of the profile information PINF of target data, a memory access of a predetermined access pattern, such that an access for the data fits an access pattern corresponding to an operating condition of a hardware prefetch function, from among the target data.

For example, the access attribute detection unit 32 detects, as the memory access of the predetermined access pattern, a memory access such that an amount (referred to as a destination shift amount) of difference between the current access destination and the previous access destination is smaller than two lines when a cache line of the cache memory is used as a unit of access. The access attribute detection unit 32 may detect, as the memory access of the predetermined access pattern, a memory access such that the access destination for accessing data changes in either one direction of an ascending order and a descending order at a certain access width. Then, the access attribute detection unit 32 generates an access attribute table that includes an access attribute indicating whether the memory access is a memory access of the predetermined access pattern.

In S300, the evaluation value computation unit 34 computes an evaluation value for target data on the basis of the access attribute included in the access attribute table generated in S200. The evaluation value computation unit 34, for example, computes a succession length of successive memory accesses that fit the predetermined access pattern on the basis of the access attribute included in the access attribute table generated in S200. Then, the evaluation value computation unit 34 computes the evaluation value for target data on the basis of the succession length. The evaluation value computation unit 34, for example, computes the maximum value of the succession length in target data as the evaluation value.

The evaluation value computation unit 34, for example, may compute the evaluation value on the basis of the frequency (occurrence frequency) of occurrence of successive memory accesses for each succession length. The evaluation value computation unit 34, for example, may perform a multiply-accumulate operation on the occurrence frequency of successive memory accesses for each succession length and a weighting coefficient corresponding to the size of the succession length and compute the result of the multiply-accumulate operation as the evaluation value. The weighting coefficient may be set to be rewritable by a user or may be a fixed value.

In S400, the prefetch instruction insertion unit 36 determines whether the evaluation value computed in S300 is smaller than a predetermined threshold for each target data. The threshold, for example, is a value that is approximately half the number of data in the target data. When the evaluation value is smaller than the threshold (Yes in S400), the operation of the compiling device 10 proceeds to S500. That is to say, S500 is performed for target data having an evaluation value smaller than the threshold. When the evaluation value is greater than or equal to the threshold (No in S400), the operation of the compiling device 10 proceeds to S600. That is to say, S600 is performed for target data having an evaluation value greater than or equal to the threshold.

The determination in S400 corresponds to determination of whether performing the software prefetch causes performance degradation of the arithmetic processing device. The compiling device 10, for example, determines that the performance of the arithmetic processing device is improved in a case where the software prefetch is performed for target data having an evaluation value smaller than the threshold when compared with a case where the software prefetch is not performed. In other words, the compiling device 10 determines that the performance of the arithmetic processing device is degraded in a case where the software prefetch is performed for target data having an evaluation value greater than or equal to the threshold when compared with a case where the software prefetch is not performed.

In S500, the prefetch instruction insertion unit 36, for example, generates intermediate code (referred to as intermediate code for the prefetch instruction) for performing the prefetch instruction for target data having an evaluation value smaller than the threshold.

In this manner, the prefetch instruction insertion unit 36 prepares for insertion of a prefetch instruction for target data for which the performance of the arithmetic processing device is determined to be improved by performing the software prefetch.

In S600, the prefetch instruction insertion unit 36, for example, does not generate intermediate code (intermediate code for the prefetch instruction) for performing the prefetch instruction for target data having an evaluation value greater than or equal to the threshold. Alternatively, the prefetch instruction insertion unit 36 may generate intermediate code of "NOP" (intermediate code for no operation). When a direction of outputting a prefetch instruction for target data, that is, an instruction to insert a prefetch instruction into the machine language program, is set in advance, the prefetch instruction insertion unit 36 may generate intermediate code for deterring the direction for target data having an evaluation value greater than or equal to the threshold.

In this manner, the prefetch instruction insertion unit 36 prepares for suppression of insertion of a prefetch instruction for target data for which the performance of the arithmetic processing device is determined to be degraded by performing the software prefetch.

In S700, the prefetch instruction insertion unit 36 inserts the prefetch instruction generated in S500 or S600 into the intermediate code generated in S100 to update the intermediate code generated in S100. In this manner, the prefetch instruction insertion unit 36 optimizes the intermediate code generated in S100. That is to say, the prefetch instruction insertion unit 36 updates the intermediate code on the basis of the determination result (the determination result in S400) of whether to suppress insertion of a prefetch instruction for target data.

In S800, the code generation unit 40 converts the intermediate code updated in S700 into the machine language program MPRG. Accordingly, the machine language program MPRG that is executable by the arithmetic processing device is generated. Insertion of an unnecessary prefetch instruction is suppressed, and a prefetch instruction that contributes to improving the performance of the arithmetic processing device is inserted into the machine language program MPRG generated in S800. That is to say, the compiling device 10 may reduce insertion of an unnecessary prefetch instruction when prefetch instructions are inserted into the machine language program MPRG through the compilation process.

The operation of the compiling device 10 is not limited to this example. For example, the compiling device 10 may suppress insertion of a prefetch instruction without performing determination based on the profile information PINF when the access pattern of target data is determined to be in an ascending order or a descending order through a static analysis at the time of compiling the source program SPRG.

Figure 3:
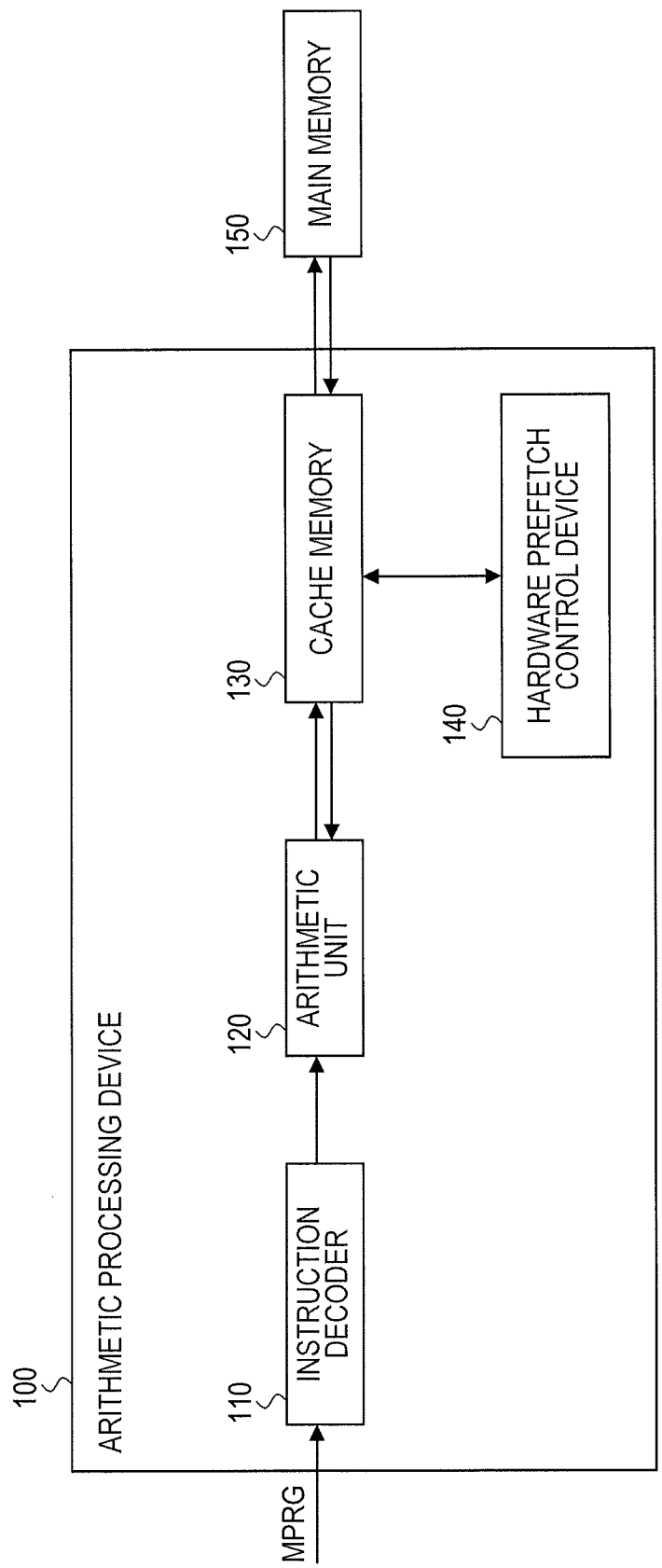
FIG. 3 is a diagram illustrating an example of an arithmetic processing device that executes a machine language program generated by the compiling device.

FIG. 3 illustrates an example of the arithmetic processing device 100 that executes the machine language program generated by the compiling device 10 illustrated in FIG. 1. The arithmetic processing device 100, for example, is a processor such as a central processing unit (CPU) and the like. The arithmetic processing device 100, for example, reads data stored in a main memory 150 to execute the machine language program MPRG generated by the compiling device 10. In addition, the arithmetic processing device 100 stores an execution result (operation result) of the machine language program MPRG in the main memory 150.

The arithmetic processing device 100, for example, includes an instruction decoder 110, an arithmetic unit 120, a cache memory 130, and the hardware prefetch control device 140. The instruction decoder 110 decodes an instruction indicated by the machine language program MPRG. Then, the instruction decoder 110 outputs the decoded instruction to the arithmetic unit 120.

The arithmetic unit 120 performs an operation based on the decoded instruction. For example, the arithmetic unit 120 performs an operation with reference to data stored in the cache memory 130. In addition, the arithmetic unit 120, for example, stores the operation result in the cache memory 130.

The cache memory 130 stores data received from the main memory 150. For example, the cache memory 130 stores data referred to by the arithmetic unit 120. Furthermore, the cache memory 130 stores data that is transferred from the main memory 150 by the hardware prefetch or the software prefetch. In addition, the cache memory 130 outputs data such as the operation result and the like to the main memory 150.

Given that, for example, CL is a cache line number of the cache memory 130, LS is the size (byte) of a line, WS is the capacity (kilobyte) per one way, and addr is a logical address, the cache line number CL is represented by Equation (1). The logical address addr, for example, is an address in the main memory 150.

$$CL=\mathrm{mod}(addr/LS,(WS\times1024)/LS) \quad (1)$$

In Equation (1), mod is a modulo operator. That is to say, the cache line number CL corresponds to the remainder of division of "addr/LS" by "(WS×1024)/LS".

The hardware prefetch control device 140 controls whether to perform the hardware prefetch. For example, the hardware prefetch control device 140 performs the hardware prefetch when detecting a series of cache misses to occur during an access such that the access destination changes regularly.

The hardware prefetch control device 140, for example, performs the hardware prefetch when detecting cache misses on consecutive cache lines during a continuous area access. The continuous area access, for example, is an access such that the destination shift amount is smaller than two lines, that is, the destination shift amount is within a range in which the cache lines are consecutive, when a cache line of the cache memory 130 is used as a unit of access.

The condition (operating condition) of performing the hardware prefetch is not limited to this example. For example, the hardware prefetch control device 140 may perform the hardware prefetch when detecting a series of cache misses to occur during an access such that the access destination changes in either one direction of an ascending order and a descending order at a certain access width.

Figure 4:
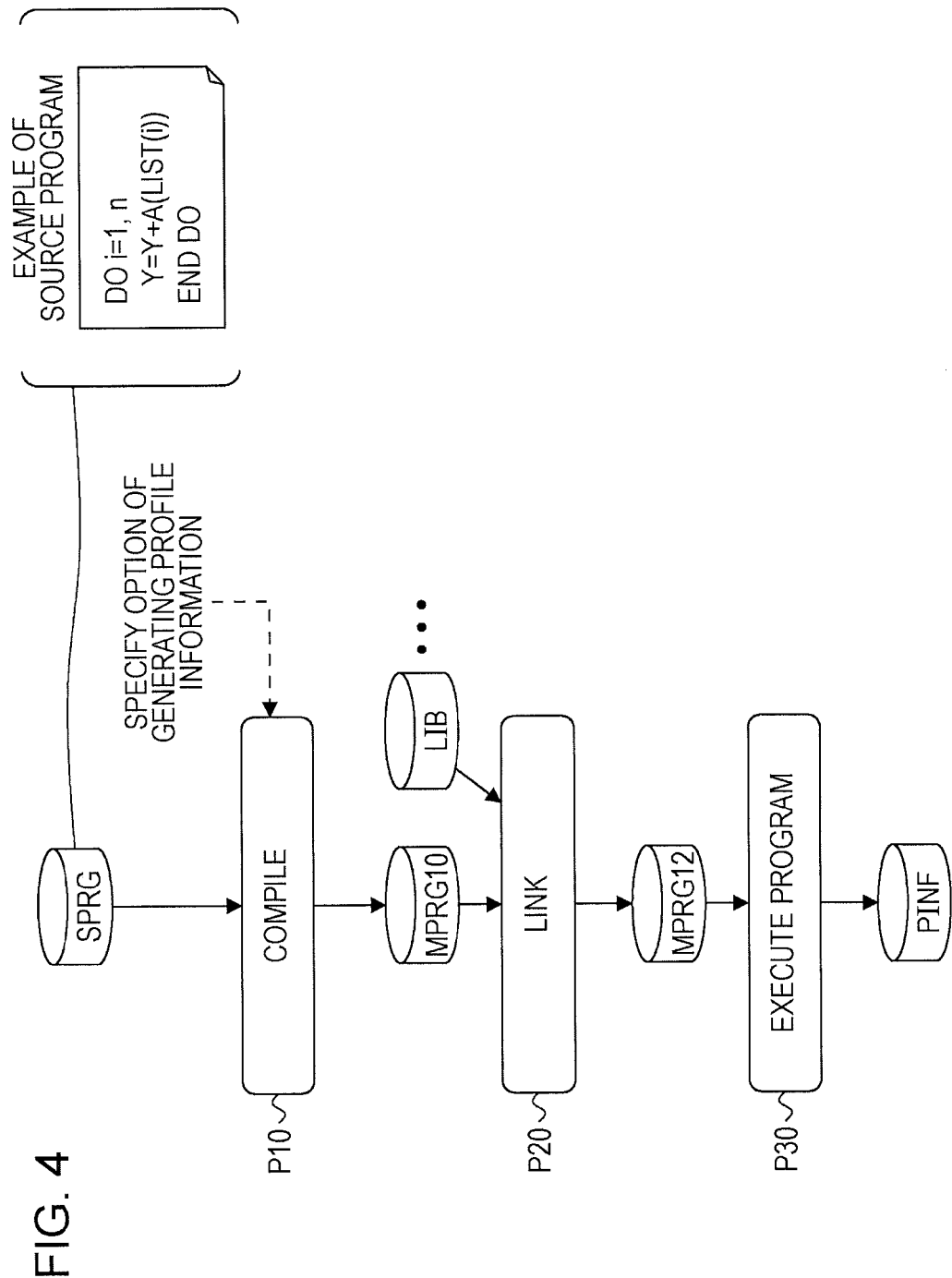
FIG. 4 is a diagram illustrating an example of a method for generating profile information.

FIG. 4 illustrates an example of a method for generating the profile information PINF. In the source program SPRG illustrated in FIG. 4, for example, an operation of adding a value indicated by array data A(LIST(i)) to Y is repeated n times. The array data A(LIST(i)) is also referred to as array data A hereinafter. The access destination of the array data A, for example, is specified by array data LIST(i) and is determined when the source program SPRG is executed by the arithmetic processing device 100. Therefore, an access to the array data A is an irregular indirect memory access. That is to say, the array data A is target data for which a prefetch instruction is to be inserted. In the following description, the array data A is assumed to be target data.

First, in P10, a compilation option of generating the profile information is specified to a compiler, and the source program SPRG as a compilation target is compiled into a machine language program MPRG10. The compiler, for example, corresponds to a compilation program for realizing the operation of the compiling device 10.

The machine language program MPRG10 generated in P10, for example, is a program in object format. The machine language program MPRG10, for example, includes object code for generating the profile information and object code that is generated by the compilation of the source program SPRG. The object code for generating the profile information, for example, is object code for outputting the profile information PINF of data for which a prefetch instruction is to be inserted when the source program SPRG is executed.

Since the compilation option of generating the profile information is specified, the compiling device 10 generates, for example, when compiling the source program SPRG, object code for outputting the profile information of the array data A when the source program SPRG is executed.

In P20, various libraries LIB such as a profile library and the like are linked to the machine language program MPRG10 and a machine language program MPRG12 is generated. The machine language program MPRG12 is a program in executable format. The linking in P20, for example, is performed by using a linker. The linker, for example, is a program for linking the program MPRG10 in object format to the library LIB to generate the program MPRG12 in executable format. The linker may be included in the compilation program for realizing the operation of the compiling device 10 or may be a program separated from the compilation program.

In P30, the machine language program MPRG12 is executed. Accordingly, the profile information PINF is generated. The arithmetic processing device 100, for example, executes the machine language program MPRG12 to output the profile information PINF of the array data A to an external unit.

In this manner, the compiling device 10 generates object code for causing the arithmetic processing device 100 which executes the source program SPRG to output the profile information PINF for each target data. The profile information PINF output for each target data by the arithmetic processing device 100, for example, includes an index and address information. The index indicates the access order of each piece of data in the target data, and the address information indicates the access destination. The method for generating the profile information PINF is not limited to this example.

Figure 5:
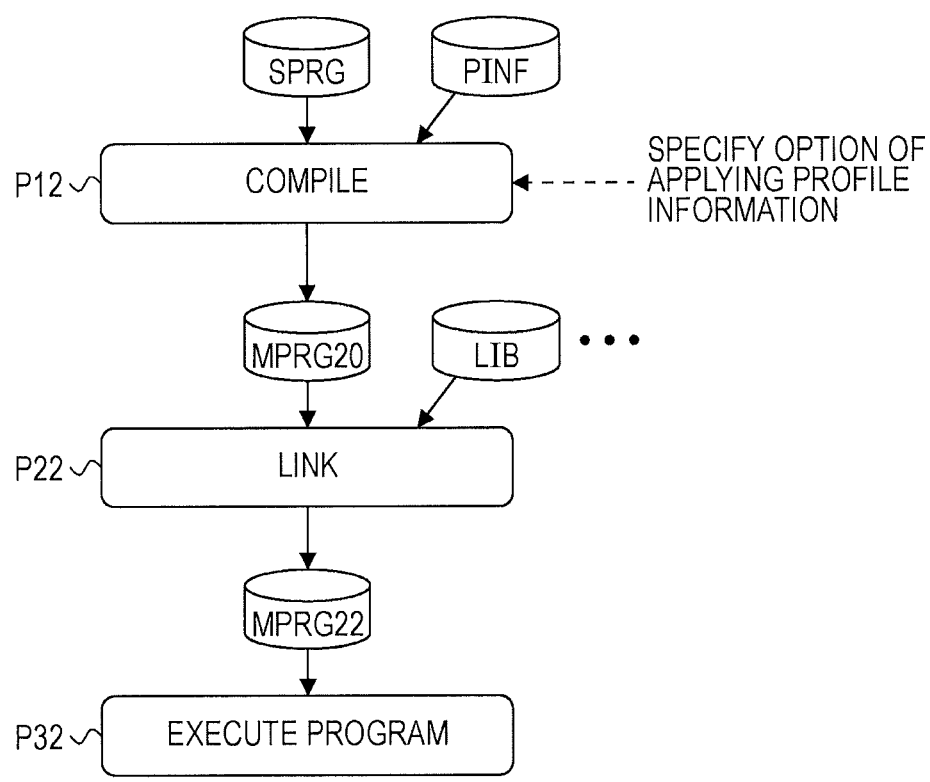
FIG. 5 is a diagram illustrating an example of a method for applying the profile information.

FIG. 5 illustrates an example of a method for applying the profile information PINF. The source program SPRG is the same as or similar to the source program SPRG described in FIG. 4. The profile information PINF here, for example, is the profile information PINF generated by the operation illustrated in FIG. 4. Detailed description of the operation that is the same as or similar to the operation illustrated in FIG. 4 will be omitted.

In P12, for example, a compilation option of applying the profile information is specified to the compiler, and the source program SPRG as a compilation target is compiled into a machine language program MPRG20. At this time, since the compilation option of applying the profile information is specified, the compiling device 10, for example, determines whether to suppress insertion of a prefetch instruction for irregularly and indirectly accessed data (for example, the array data A) on the basis of the profile information PINF.

Upon detecting irregularly and indirectly accessed data (for example, the array data A), the compiling device 10, for example, determines that the detected data is target data for which a prefetch instruction is to be inserted. Then, the compiling device 10 determines whether to suppress insertion of a prefetch instruction for the target data (irregularly and indirectly accessed data) on the basis of the profile information PINF. That is to say, the compiling device 10 determines whether to insert a prefetch instruction for irregularly and indirectly accessed data (for example, the array data A) into the machine language program MPRG20 on the basis of the profile information PINF.

Therefore, when the compiling device 10 determines to suppress insertion of a prefetch instruction for the array data A, the compiling device 10, for example, does not insert a prefetch instruction for the array data A into the machine language program MPRG20. When the compiling device 10 determines not to suppress insertion of a prefetch instruction for the array data A, the compiling device 10, for example, inserts a prefetch instruction for the array data A into the machine language program MPRG20. In this manner, the determination result of whether to suppress insertion of a prefetch instruction is reflected on the machine language program MPRG20 generated in P12. The machine language program MPRG20, for example, is a program in object format.

In P22, for example, various libraries LIB are linked to the machine language program MPRG20 and a machine language program MPRG22 is generated. The machine language program MPRG22 is a program in executable format. The linking in P22, for example, is performed by using the linker. In P32, the machine language program MPRG22 is executed.

The method for applying the profile information PINF is not limited to this example. For example, the target data may be specified by an optimization control line, a pragma, or the like, for giving an instruction to the compiler. The optimization control line, for example, is used in FORTRAN. The pragma, for example, is used in C language and the like.

A user, for example, may write an optimization control line (for example, "!ocl Prefetch_index(auto, LIST)") for specifying the array data A(LIST(i)) as target data for which a prefetch instruction is to be inserted in the source program SPRG. In this case, the compiling device 10 determines that the array data A(LIST(i)) is target data. Therefore, data that is not specified by the optimization control line is not determined to be target data even if the data is irregularly and indirectly accessed data. In P10 illustrated in FIG. 4, the compiling device 10 may generate object code for generating the profile information PINF only for data specified by the optimization control line when target data is specified by the optimization control line.

Figure 6:
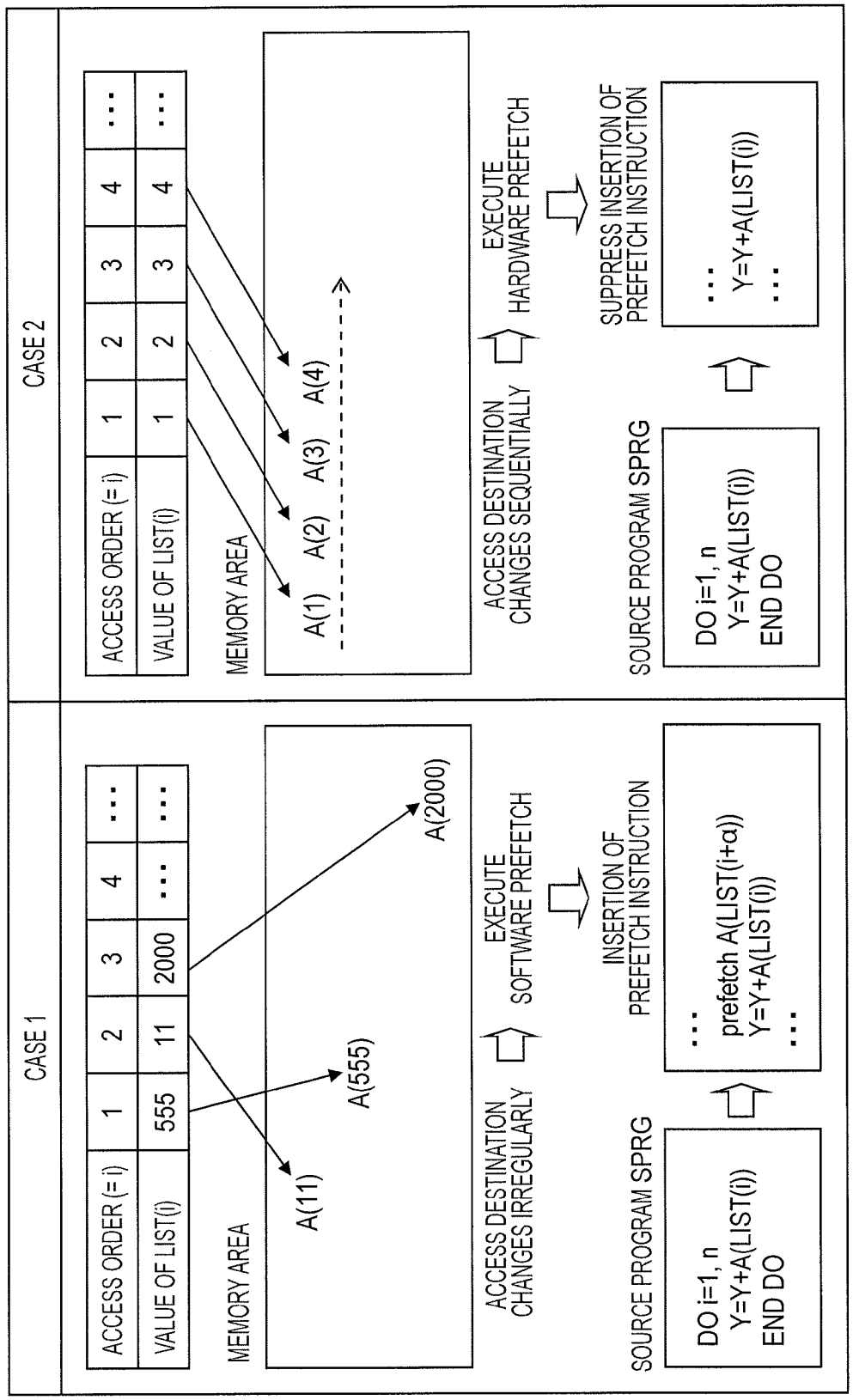
FIG. 6 is a diagram illustrating an example of a relationship between an access order of array data and a prefetch.

FIG. 6 is a diagram illustrating an example of a relationship between the access order of the array data A(LIST(i)) and the prefetch. The source program SPRG is the same as or similar to the source program SPRG described in FIG. 4. The array data A(LIST(i)) is target data for which a prefetch instruction is to be inserted. The sign i in FIG. 6 corresponds to the access order of the array data A. The value of the array data LIST(i) in FIG. 6 corresponds to the access destination (the address in the memory area) of the array data A.

In case 1, the respective values of the array data LIST(1), the array data LIST(2), and the array data LIST(3) are 555, 11, and 2000. Therefore, the array data A(555), the array data A(11), and the array data A(2000) are accessed in this order. In this manner, the access destination of the array data A irregularly changes in order of the addresses 555, 11, and 2000 in the memory area.

For this reason, the hardware prefetch is not performed for the array data A. The software prefetch is performed for the array data A. Therefore, a prefetch instruction is inserted for the array data A. "prefetch A(LIST(i+α))" in FIG. 6 indicates that a value of the array data A to be accessed α accesses later is pre-fetched. Accordingly, the prefetch is performed even for irregularly and indirectly accessed data. As a result, according to the present embodiment, the waiting time for referring to data may be shortened.

In case 2, the respective values of the array data LIST(1), the array data LIST(2), the array data LIST(3), and the array data LIST(4) are one, two, three, and four. Therefore, the array data A(1), the array data A(2), the array data A(3), and the array data A(4) are accessed in this order. In this manner, the access destination of the array data A sequentially changes in order of the addresses 1, 2, 3, and 4 in the memory area.

For this reason, the hardware prefetch is performed for the array data A. Thus, according to the present embodiment, the waiting time for referring to data may be shortened. Since the access destination of the array data A changes in accordance with a predetermined rule corresponding to the operating condition of the hardware prefetch, the software prefetch is not performed for the array data A. That is to say, according to the present embodiment, the situation in which both of the hardware prefetch and the software prefetch are performed concurrently may be suppressed when the access destination of target data changes regularly.

The compiling device 10, for example, suppresses insertion of a prefetch instruction for the array data A. Thus, according to the present embodiment, insertion of an unnecessary prefetch instruction may be suppressed when the access destination of target data changes regularly. In this manner, according to the present embodiment, insertion of an unnecessary prefetch instruction may be reduced when prefetch instructions are inserted into the machine language program through the compilation process. As a result, according to the present embodiment, the performance degradation of the arithmetic processing device 100 due to insertion of an unnecessary prefetch instruction may be reduced.

Determination of whether to suppress insertion of a prefetch instruction is based on an evaluation value as described in FIG. 2. The evaluation value is generated, for example, based on a succession length management table TABL2 illustrated in FIG. 9. The succession length management table TABL2 is generated, for example, based on an access attribute table TABL1 illustrated in FIG. 7. The access attribute table TABL1 is generated based on the profile information PINF.

Figure 7:
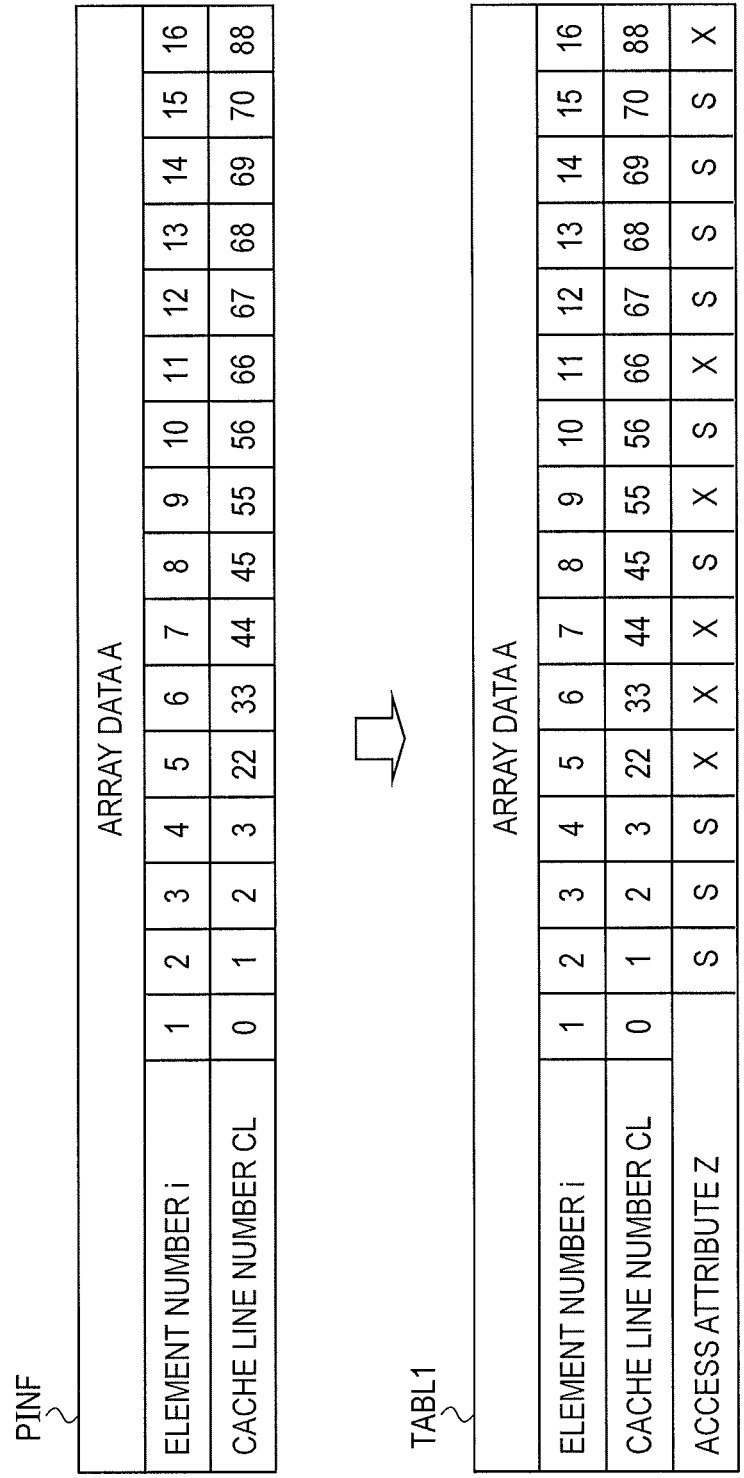
FIG. 7 is a diagram illustrating examples of the profile information and an access attribute table.

FIG. 7 illustrates examples of the profile information PINF and the access attribute table TABL1. The profile information PINF and the access attribute table TABL1, for example, are generated for each unit of insertion of a prefetch instruction. For example, the profile information PINF and the access attribute table TABL1 are generated for each loop process for target data.

The profile information PINF of the array data A, for example, includes an element number i and the cache line number CL. The element number i indicates the access order, and the cache line number CL indicates the access destination. In the example in FIG. 7, the array size n of the array data A is 16. The cache line number CL, for example, is the address information that indicates the access destination. The cache line number CL indicates the cache line of the cache memory 130 where each piece of data of the array data A is stored. Computation of the cache line number CL, for example, is performed by using Equation (1), based on the logical address addr (for example, the address in the main memory 150) of each piece of data of the array data A.

According to the profile information PINF illustrated in FIG. 7, the respective cache line numbers CL, where pieces of data that correspond to the element numbers 1, 2, 3, and 4 in the array data A are stored, are 0, 1, 2, and 3. The respective cache line numbers CL, where pieces of data that correspond to the element numbers 5, 6, 7, and 8 in the array data A are stored, are 22, 33, 44, and 45. The respective cache line numbers CL, where pieces of data that correspond to the element numbers 9, 10, 11, and 12 in the array data A are stored, are 55, 56, 66, and 67. The respective cache line numbers CL, where pieces of data that correspond to the element numbers 13, 14, 15, and 16 in the array data A are stored, are 68, 69, 70, and 88.

The access attribute table TABL1 which is generated based on the profile information PINF of the array data A, for example, includes the element number i, the cache line number CL, and an access attribute Z. That is to say, the access attribute table TABL1 is generated by adding the access attribute Z to the profile information PINF.

Information "S" in a cell of the access attribute Z in FIG. 7 indicates that the access destination changes in accordance with the predetermined rule corresponding to the operating condition of the hardware prefetch function. Information "X" indicates that the access destination changes regardless of the predetermined rule. The access attributes Z where the information "S" and the information "X" are respectively set are also referred to as access attributes "S" and "X" hereinafter. The access attribute "S", for example, indicates that the destination shift amount is smaller than two lines, that is, the destination shift amount is within the range in which the cache lines are consecutive. The access attribute "X" indicates that the change of the access destination is not consecutive, that is, a change between inconsecutive cache lines.

The access attribute is not set for the element number 1 (i=1) of the access attribute table TABL1 because the element number 1 is initially accessed. The access attribute Z for the element numbers 2, 3, 4, 8, 10, 12, 13, 14, and 15 is set to the information "S" because the difference between the cache line number CL of these element numbers and the cache line number CL of the previous element numbers (i−1) thereof is one line (smaller than two lines). The differences between the cache line numbers CL corresponding to the element numbers 5, 6, 7, 9, 11, and 16 and the cache line numbers CL of the previous element numbers thereof (i−1) are respectively 19, 11, 11, 10, 10, and 18 and are greater than or equal to two lines (exceeds one line). For this reason, the access attribute Z for the element numbers 5, 6, 7, 9, 11, and 16 is set to the information "X".

The configuration of the profile information PINF and the access attribute table TABL1 is not limited to this example. For example, in addition to the element number i and the cache line number CL, the profile information PINF may include the address information indicating the logical address addr of each piece of data of the array data A. Alternatively, the profile information PINF may include the address information indicating the logical address addr instead of the cache line number CL.

The profile information PINF may include the access attribute Z. In this case, the profile information PINF may be used as the access attribute table TABL1. The cache line number CL of the access attribute table TABL1 may be omitted.

Figure 8:
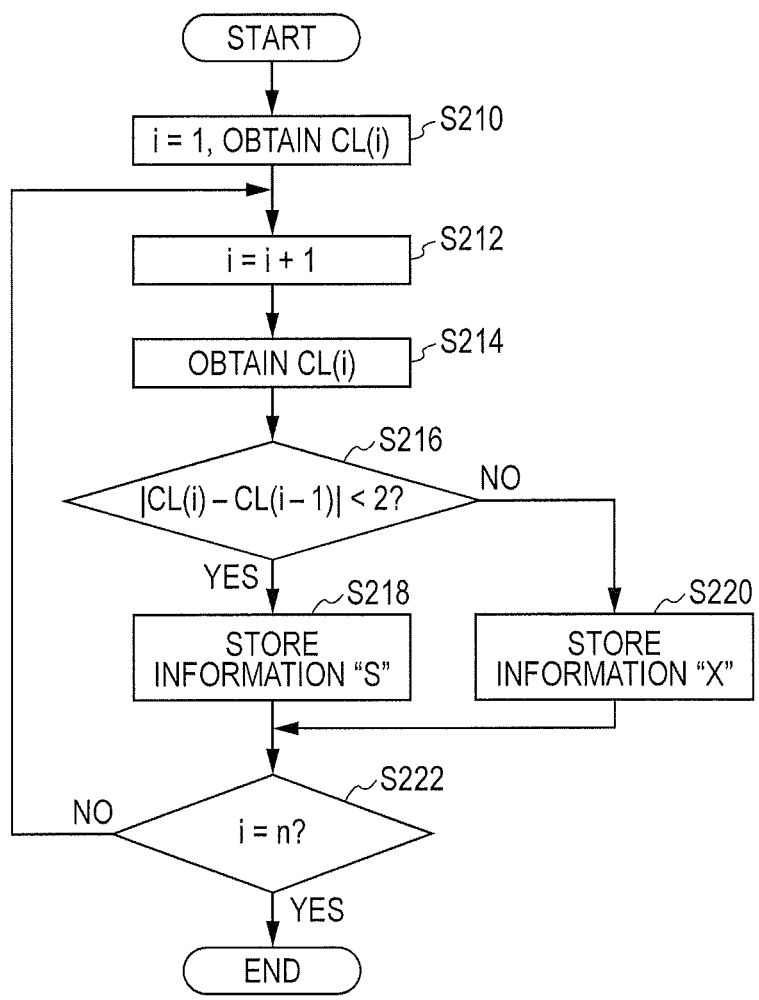
FIG. 8 is a flowchart illustrating an example of generation of the access attribute table.

FIG. 8 illustrates an example of generation of the access attribute table. The operation illustrated in FIG. 8 may be realized only by hardware or may be realized by hardware under control of software. In the operation illustrated in FIG. 8, it is assumed that the predetermined access pattern corresponding to the operating condition of the hardware prefetch function is an access pattern in which the destination shift amount is smaller than two lines. The operation illustrated in FIG. 8 corresponds to S200 illustrated in FIG. 2.

In FIG. 8, the cache line number CL corresponding to the element number i is also referred to as a cache line number CL(i). Data that is accessed at the i-th time in the array data A, for example, is stored in the cache line of the cache line number CL(i).

In S210, the access attribute detection unit 32 sets the element number i to 1. In addition, the access attribute detection unit 32 obtains the cache line number CL(i) corresponding to the element number i from the profile information PINF. For example, when the element number i is one, the access attribute detection unit 32 reads, from the profile information PINF, the cache line number CL(1) corresponding to the element number 1 in the profile information PINF.

When the profile information PINF includes the logical address addr instead of the cache line number CL, the access attribute detection unit 32 computes the cache line number CL(i) corresponding to the element number i by using Equation (1).

In S212, the access attribute detection unit 32 increments the element number i. The access attribute detection unit 32, for example, adds one to the value of the element number i to update the element number i.

In S214, the access attribute detection unit 32 obtains the cache line number CL(i) corresponding to the element number i from the profile information PINF. For example, the access attribute detection unit 32 reads, from the profile information PINF, the cache line number CL(i) corresponding to the element i in the profile information PINF.

In S216, the access attribute detection unit 32 determines whether the absolute value of the difference between the cache line number CL(i) and the cache line number CL(i−1) is smaller than two. When the element number i is two, the cache line number CL(i−1) has been obtained in S210, for example. When the element number i is greater than or equal to three, the cache line number CL(i−1) has been obtained in the previous operation of S214.

When the absolute value of the difference between the cache line number CL(i) and the cache line number CL(i−1) is smaller than two (Yes in S216), the operation of the access attribute detection unit 32 proceeds to S218. That is to say, the operation of the access attribute detection unit 32 proceeds to S218 when the access pattern, which is predicted based on the cache line numbers CL(i) and CL(i−1), satisfies the predetermined rule corresponding to the operating condition of the hardware prefetch function. In other words, the operation of the access attribute detection unit 32 proceeds to S218 when the access destination of the array data A changes in accordance with the predetermined rule corresponding to the operating condition of the hardware prefetch function.

When the absolute value of the difference between the cache line number CL(i) and the cache line number CL(i−1) is greater than or equal to two (No in S216), the operation of the access attribute detection unit 32 proceeds to S220. That is to say, the operation of the access attribute detection unit 32 proceeds to S220 when the access pattern, which is predicted based on the cache line numbers CL(i) and CL(i−1), does not satisfy the predetermined rule corresponding to the operating condition of the hardware prefetch function. In other words, the operation of the access attribute detection unit 32 proceeds to S220 when the access destination of the array data A changes regardless of the predetermined rule corresponding to the operating condition of the hardware prefetch function.

In S218, the access attribute detection unit 32 stores the information "S", which indicates that the access destination changes in accordance with the predetermined rule corresponding to the operating condition of the hardware prefetch function, in the access attribute Z corresponding to the element number i. The access attribute detection unit 32, for example, sets the information "S", which indicates a consecutive access, for the access attribute Z corresponding to the element number i.

In S220, the access attribute detection unit 32 stores the information "X", which indicates that the access destination changes regardless of the predetermined rule corresponding to the operating condition of the hardware prefetch function, in the access attribute Z corresponding to the element number i. The access attribute detection unit 32, for example, sets the information "X", which indicates an inconsecutive access, for the access attribute Z corresponding to the element number i.

In S222, the access attribute detection unit 32 determines whether the element number i has the same value as the array size n of the array data A. When the element number i does not have the same value as the array size n of the array data A (No in S222), the operation of the access attribute detection unit 32 returns to S212.

When the element number i has the same value as the array size n of the array data A (Yes in S222), the operation of the access attribute detection unit 32 ends. Accordingly, for example, the access attribute table TABL1 illustrated in FIG. 7 is generated.

The operation of the access attribute detection unit 32 is not limited to this example. For example, in S216, the access attribute detection unit 32 may determine whether the difference between the cache line number CL(i) and the cache line number CL(i−1) is equal to a predetermined line width. That is to say, the access attribute detection unit 32 may determine whether the access destination, when a cache line of the cache memory 130 is used as a unit of access, changes in either one direction of an ascending order and a descending order at a certain line width. For example, S218 is performed when the difference between the cache line number CL(i) and the cache line number CL(i−1) is equal to the predetermined line width.

Alternatively, in S216, the access attribute detection unit 32 may determine whether the access destination indicated by the logical address changes in either one direction of an ascending order and a descending order at a certain access width. That is to say, the access attribute detection unit 32 may detect data of which the access destination changes in either one direction of an ascending order and a descending order at a certain access width. For example, S218 is performed for data of which the access destination changes in either one direction of an ascending order and a descending order at a certain access width.

FIG. 9 illustrates examples of the access attribute table TABL1 and the succession length management table TABL2. The succession length management table TABL2, for example, is generated for each unit of insertion of a prefetch instruction. The succession length management table TABL2, for example, is generated for each loop process for target data for which a prefetch instruction is to be inserted.

The succession length management table TABL2 of the array data A, for example, includes information that indicates the length (succession length L) of successive memory accesses that fit the predetermined access pattern and information that indicates the occurrence frequency c for each succession length L. The maximum value of the succession length L, for example, is a value obtained by subtracting one from the array size n of the array data A. The succession length management table TABL2 illustrated in FIG. 9 is an example of a succession length management table TABL2 when the array size n of the array data A is 16.

In the access attribute table TABL1, there is one instance of the part where the access attribute "S" occurs three times consecutively (succession length L=3), two instances of the part where the access attribute "S" occurs once (succession length L=1), and one instance of the part where the access attribute "S" occurs four times consecutively (succession length L=4). The number of the access attributes "X" is six.

Therefore, the occurrence frequency c of the successive memory accesses with the succession length L of zero is set to six in the succession length management table TABL2. The occurrence frequency c of the successive memory accesses with the succession length L of one is set to two. The occurrence frequency c of the successive memory accesses with the succession length L of three is set to one, and the occurrence frequency c of the successive memory accesses with the succession length L of four is set to one. The occurrence frequency c of the successive memory accesses with the succession length L of each of two, five, . . . , and 15 is set to zero.

The succession length management table TABL2, for example, is referred to when the evaluation value for the array data A (target data) is computed. The evaluation value computation unit 34, for example, may compute the evaluation value (Va in Equation (2)) that is represented by Equation (2).

$$Va = \Sigma(L(i) \times c(i)) \tag{2}$$

L(i) and c(i) in Equation (2) respectively indicate the i-th succession length L and the i-th occurrence frequency c in the succession length management table TABL2. i in Equation (2) is an integer ranging from one to m when the number of elements in the succession length management table TABL2 is m (16 in the example in FIG. 9). The evaluation value Va represented by Equation (2) is an example of an evaluation value which is computed based on the succession length L and the occurrence frequency c.

The configuration of the succession length management table TABL2 is not limited to this example. For example, the maximum value of the succession length L in the succession length management table TABL2 may be smaller than the value obtained by subtracting one from the array size n of the array data A. When, for example, the array size n of the array data A is 16, the maximum value of the succession length L may be approximately half the array size n (eight in the example in FIG. 9). In this case, the number of the parts where the access attribute "S" consecutively occurs a greater number of times than or equal to the maximum value (for example, eight) of the succession length L is set as the occurrence frequency c of the successive memory accesses with the succession length L equal to the maximum value.

The succession length management table TABL2 may include a weighting coefficient corresponding to the size of the succession length L. In this case, the evaluation value computation unit 34, for example, may compute the evaluation value Va that is represented by Equation (3). The meaning of i and c(i) in Equation (3) is the same as or similar to that in Equation (2). w(i) in Equation (3) indicates the weighting coefficient of the succession length L(i).

$$Va = \Sigma(c(i) \times w(i)) \tag{3}$$

The weighting coefficient w(i) may be a fixed value or may be a value that is arbitrarily set by a user. The evaluation value Va represented by Equation (3) is an example of an evaluation value which is computed based on the succession length L and the occurrence frequency c because the weighting coefficient w(i) is set for each succession length L(i).

The compiling device 10, for example, may accurately determine the frequency of performance of the hardware prefetch for the array data A by using the evaluation value which is computed based on the succession length L and the occurrence frequency c when compared with a case of using the evaluation which is computed based only on the succession length L.

Figure 10:
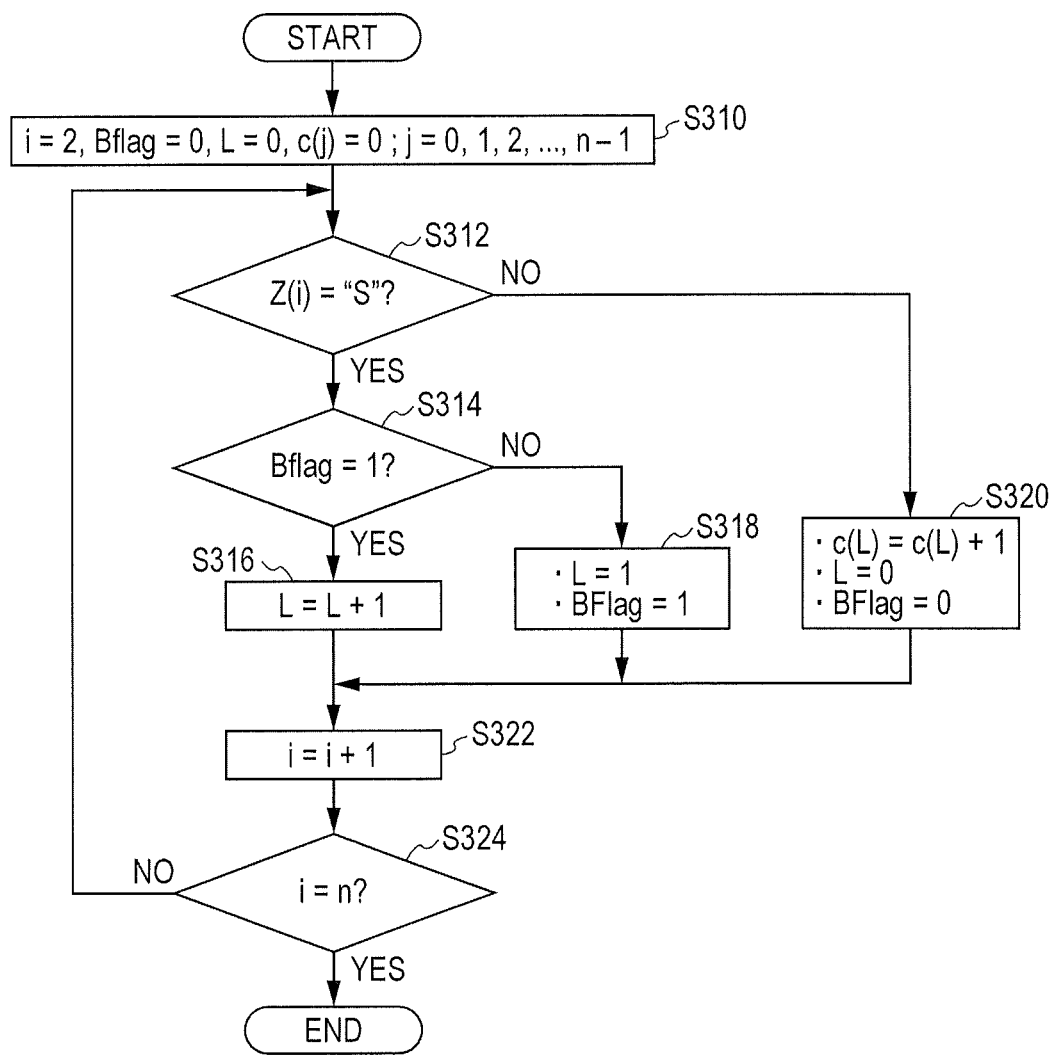
FIG. 10 is a flowchart illustrating an example of generation of the succession length management table.

FIG. 10 illustrates an example of generation of the succession length management table. The operation illustrated in FIG. 10 may be realized only by hardware or may be realized by hardware under control of software. In the operation illustrated in FIG. 10, for example, it is assumed that the maximum value of the succession length L in the succession length management table TABL2 is the value obtained by subtracting one from the array size n of the array data A. The operation illustrated in FIG. 10 corresponds to the operation of a part of S300 illustrated in FIG. 2. S310 to S324 are performed by the evaluation value computation unit 34, for example. S310 to S324 may be performed by a module (for example, the access attribute detection unit 32) other than the evaluation value computation unit 34.

The occurrence frequency c(L) in FIG. 10 indicates the occurrence frequency c of the successive memory accesses with the succession length L. In the succession length management table TABL2 illustrated in FIG. 9, for example, the occurrence frequency c(0) indicates the occurrence frequency c (six in FIG. 9) of the successive memory accesses with the succession length L of zero, and the occurrence frequency c(1) indicates the occurrence frequency c (two in FIG. 9) of the successive memory accesses with the succession length L of one. The element number i in FIG. 10 indicates the element number i in the access attribute table TABL1.

In S310, the evaluation value computation unit 34 sets initial data. The evaluation value computation unit 34, for example, sets the element number i in the access attribute table TABL1 to two and sets a flag Bflag, the succession length L, and the occurrence frequency c(j) to zero. j is an integer ranging from zero to n−1. The flag Bflag is a flag for holding the access attribute Z of the previous element.

In S312, the evaluation value computation unit 34 determines whether the access attribute Z(i) corresponding to the element number i in the access attribute table TABL1 is equal to the access attribute "S" that indicates a consecutive access. When the access attribute Z(i) is equal to the access attribute "S" (Yes in S312), the operation of the evaluation value computation unit 34 proceeds to S314. When the access attribute Z(i) is not equal to the access attribute "S" (No in S312), the operation of the evaluation value computation unit 34 proceeds to S320. That is to say, the operation of the evaluation value computation unit 34 proceeds to S320 when the access attribute Z(i) is equal to the access attribute "X" that indicates an inconsecutive access.

In S314, the evaluation value computation unit 34 determines whether the flag Bflag is equal to one. That is to say, the evaluation value computation unit 34 determines whether the access attribute Z(i−1) of the previous element is equal to the access attribute "S". When the flag Bflag is equal to one (Yes in S314), the operation of the evaluation value computation unit 34 proceeds to S316. That is to say, the operation of the evaluation value computation unit 34 proceeds to S316 when the access attribute Z(i−1) of the previous element is equal to the access attribute "S".

When the flag Bflag is not equal to one (No in S314), the operation of the evaluation value computation unit 34 proceeds to S318. That is to say, the operation of the evaluation value computation unit 34 proceeds to S318 when the access attribute Z(i−1) of the previous element is equal to the access attribute "X".

In S316, the evaluation value computation unit 34 increments the value of the succession length L. The evaluation value computation unit 34, for example, adds one to the value of the succession length L to update the succession length L. That is to say, the evaluation value computation unit 34 increments the value of the succession length L when both the access attribute Z(i) and the access attribute Z(i−1) are equal to the access attribute "S" (when a consecutive access continues).

In S318, the evaluation value computation unit 34 sets the value of the succession length L and the flag Bflag to one. That is to say, the evaluation value computation unit 34 sets the value of the succession length L and the flag Bflag to one when the access attribute Z(i) and the access attribute Z(i−1) are respectively equal to the access attributes "S" and "X" (when a consecutive access starts).

In S320, the evaluation value computation unit 34 increments the occurrence frequency c(L). The evaluation value computation unit 34, for example, adds one to the occurrence frequency c(L) to update the occurrence frequency c(L). Accordingly, the occurrence frequency of the successive memory accesses with the succession length L is incremented. After updating the occurrence frequency c(L), the evaluation value computation unit 34 sets the value of the succession length L and the flag Bflag to zero.

That is to say, the evaluation value computation unit 34 initializes the value of the succession length L and the flag Bflag to zero after incrementing the occurrence frequency c(L) when the access attribute Z(i) is equal to the access attribute "X" (in a case of an inconsecutive access).

In S322, the evaluation value computation unit 34 increments the element number i. The evaluation value computation unit 34, for example, adds one to the value of the element number i to update the element number i.

In S324, the evaluation value computation unit 34 determines whether the element number i has the same value as the array size n of the array data A. When the element number i does not have the same value as the array size n of the array data A (No in S324), the operation of the evaluation value computation unit 34 returns to S312.

When the element number i has the same value as the array size n of the array data A (Yes in S324), the evaluation value computation unit 34 ends the operation for generation of the succession length management table. Accordingly, for example, the succession length management table TABL2 illustrated in FIG. 9 is generated. The evaluation value computation unit 34, for example, computes an evaluation value with reference to the generated succession length management table TABL2.

The operation of the evaluation value computation unit 34 is not limited to this example. For example, in S316, the evaluation value computation unit 34 updates the succession length L such that the succession length L does not exceed the maximum value when the maximum value of the succession length L in the succession length management table TABL2 is smaller than n−1. The evaluation value computation unit 34, for example, determines whether the succession length L is equal to the maximum value before performing S316. When the succession length L is equal to the maximum value, the evaluation value computation unit 34 does not perform S316 but proceeds to S322.

Figure 11:
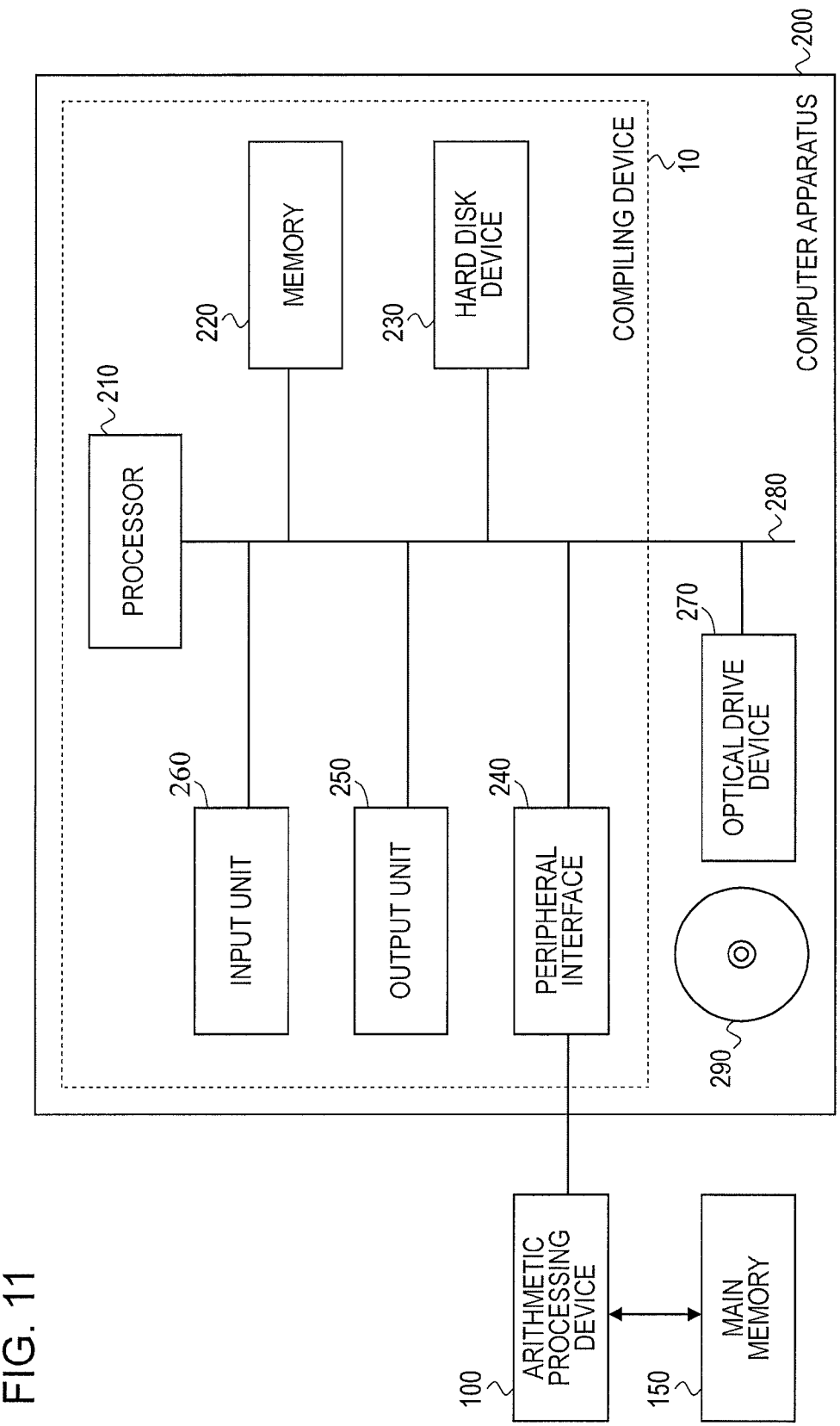
FIG. 11 is a diagram illustrating an exemplary hardware configuration of the compiling device.

FIG. 11 illustrates an exemplary hardware configuration of the compiling device 10 illustrated in FIG. 1. Similar reference numerals are given to the components that are similar to the components illustrated in FIG. 1 to FIG. 10, and detailed description thereof will be omitted.

A computer apparatus 200 includes a processor 210, a memory 220, a hard disk device 230, a peripheral interface 240, an output unit 250, an input unit 260, and an optical drive device 270. The processor 210, the memory 220, the hard disk device 230, the peripheral interface 240, the output unit 250, the input unit 260, and the optical drive device 270 are connected to one another through a bus 280.

The computer apparatus 200, for example, is connectable to the arithmetic processing device 100 through the peripheral interface 240. The optical drive device 270 is capable of having a removable disk 290 such as an optical disk mounted therein, reads information recorded on the mounted removable disk 290, and records information on the mounted removable disk 290. The processor 210, the memory 220, the hard disk device 230, the peripheral interface 240, the output unit 250, and the input unit 260 realize the functions of the compiling device 10, for example.

The output unit 250, for example, is a unit that outputs the result of a process performed by the processor 210. A display device, a touch panel, or the like is an example of the output unit 250. The input unit 260, for example, is a unit that receives user manipulation (for example, specifying a compilation option) and inputs data into the computer apparatus 200. A keyboard, a mouse, a touch panel, or the like is an example of the input unit 260.

The memory 220, for example, stores an operating system of the computer apparatus 200. In addition, for example, the memory 220 stores an application program such as the compilation program in order for the processor 210 to perform the operations illustrated in FIG. 2, FIG. 4, FIG. 5, FIG. 8, FIG. 10, and the like. The application program such as the compilation program may be stored in the hard disk device 230.

The application program such as the compilation program, for example, may be distributed by being recorded on the removable disk 290 such as an optical disk. The computer apparatus 200, for example, may read the application program such as the compilation program from the removable disk 290 through the optical drive device 270 and may store the application program on the memory 220 or the hard disk device 230. The computer apparatus 200 may download the application program such as the compilation program through a communication device (not illustrated) that is connected to a network such as the Internet and may store the application program on the memory 220 or the hard disk device 230.

The processor 210, for example, realizes the functions of the compiling device 10 illustrated in FIG. 1 by executing the compilation program stored in the memory 220 or the like. That is to say, the compiling device 10 may be realized by the processor 210, the memory 220, the hard disk device 230, the peripheral interface 240, the output unit 250, and the input unit 260 in cooperation with each other.

A hardware configuration of the compiling device 10 is not limited to the example illustrated in FIG. 11. The compiling method and the like according to the present embodiment illustrated in FIG. 1 to FIG. 11, for example, may also be applied to a prefetch instruction for storage in the compilation process for the processor that uses a prefetch instruction for storage when storing data.

As described above, in the compiling device according to the present embodiment illustrated in FIG. 1 to FIG. 11, whether to insert a prefetch instruction for target data is determined based on the profile information related to a memory access.

The access attribute detection unit 32 detects, from among memory accesses for accessing the target data for which a prefetch instruction is to be inserted, a memory access that fits a predetermined access pattern on the basis of profile information related to a memory access for accessing the target data. The predetermined access pattern, for example, is an access pattern corresponding to an operating condition of the hardware prefetch function.

The evaluation value computation unit 34 computes an evaluation value for the target data on the basis of the length of successive memory accesses that fit the predetermined access pattern. The prefetch instruction insertion unit 36 determines whether to suppress insertion of a prefetch instruction for target data on the basis of the evaluation value and updates the intermediate code on the basis of the determination result. The prefetch instruction insertion unit 36, for example, inserts a prefetch instruction for target data having an evaluation value smaller than a predetermined threshold, suppresses insertion of a prefetch instruction for target data having an evaluation value exceeding the predetermined threshold to update the intermediate code.

Thus, according to the present embodiment, insertion of an unnecessary prefetch instruction may be reduced when prefetch instructions are inserted into the machine language program through the compilation process. As a result, according to the present embodiment, the performance degradation of the arithmetic processing device 100 due to insertion of an unnecessary prefetch instruction may be reduced.

Here, for example, the proportion of data for which the hardware prefetch is performed is smaller than a predetermined proportion for the target data having an evaluation value smaller than a predetermined threshold. Therefore, the proportion of data for which both the hardware prefetch and the prefetch by a prefetch instruction are performed is smaller than the predetermined proportion when a prefetch instruction is inserted. In this case, the merit (for example, shortening the waiting time for reference of data) of inserting a prefetch instruction is greater than the demerit of insertion of a redundant prefetch instruction. For this reason, according to the present embodiment, a prefetch instruction is inserted for the target data having an evaluation value smaller than the threshold. Accordingly, the performance of the arithmetic processing device 100 may be improved.

For the target data having an evaluation value exceeding the predetermined threshold, for example, the proportion of data for which the hardware prefetch is performed is greater than the predetermined proportion. Therefore, the proportion of data for which both the hardware prefetch and the prefetch by a prefetch instruction are performed is greater than the predetermined proportion when a prefetch instruction is inserted. In this case, the demerit (for example, performance degradation such as a decrease in the transfer speed) of inserting a redundant prefetch instruction is greater than the merit of insertion of a prefetch instruction. For this reason, according to the present embodiment, insertion of a prefetch instruction is suppressed for the target data having an evaluation value exceeding the threshold. Accordingly, the performance degradation of the arithmetic processing device 100 due to insertion of an unnecessary prefetch instruction may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A compiling method, comprising:

converting, by a computer, a source program into intermediate code;

detecting, on basis of profile information related to a memory access for accessing target data stored in a memory, a memory access that fits an access pattern corresponding to an operating condition of a hardware prefetch function for the target data, the target data being data for which a prefetch instruction is to be inserted in advance, the prefetch instruction being an instruction for transferring data stored in the memory to a cache memory;

computing an evaluation value for the target data on basis of a length of successive memory accesses that fit the access pattern;

determining, on basis of the evaluation value, whether to suppress insertion of a prefetch instruction for the target data;

updating the intermediate code on basis of a result of the determination; and converting the updated intermediate code into a machine language program.

2. The compiling method according to claim 1, wherein the computer computes the evaluation value on basis of an occurrence frequency of the successive memory accesses for each length of the successive memory accesses.

3. The compiling method according to claim 1, wherein the memory access that fits the access pattern is such that a destination shift amount is smaller than two lines when a cache line of the cache memory is used as a unit of access, the destination shift amount being an amount of difference between a current access destination and a previous access destination.

4. The compiling method according to claim 1, wherein the memory access that fits the access pattern is such that an access destination changes in either one direction of an ascending order and a descending order at a certain access width.

5. The compiling method according to claim 1, wherein the profile information includes an index and address information, the index indicating an access order of each piece of data in the target data, the address information indicating an access destination, and the computer generates object code for causing a processor to output the profile information for the target data, the processor executing the source program.

6. A compiling device, comprising:

a first processor configured to convert a source program into intermediate code, detect, on basis of profile information related to a memory access for accessing target data stored in a memory, a memory access that fits an access pattern corresponding to an operating condition of a hardware prefetch function for the target data, the target data being data for which a prefetch instruction is to be inserted in advance, the prefetch instruction being an instruction for transferring data stored in the memory to a cache memory, compute an evaluation value for the target data on basis of a length of successive memory accesses that fit the access pattern, determine, on basis of the evaluation value, whether to suppress insertion of a prefetch instruction for the target data, update the intermediate code on basis of a result of the determination, and convert the updated intermediate code into a machine language program.

7. The compiling device according to claim 6, wherein the first processor is configured to compute the evaluation value on basis of an occurrence frequency of the successive memory accesses for each length of the successive memory accesses.

8. The compiling device according to claim 6, wherein the memory access that fits the access pattern is such that a destination shift amount is smaller than two lines when a cache line of the cache memory is used as a unit of access, the destination shift amount being an amount of difference between a current access destination and a previous access destination.

9. The compiling device according to claim 6, wherein the memory access that fits the access pattern is such that an access destination changes in either one direction of an ascending order and a descending order at a certain access width.

10. The compiling device according to claim 6, wherein the profile information includes an index and address information, the index indicating an access order of each piece of data in the target data, the address information indicating an access destination, and the first processor generates object code for causing a second processor to output the profile information for the target data, the second processor executing the source program.

11. A non-transitory computer-readable recording medium having stored therein a program for causing a computer to execute a process, the process comprising:

converting a source program into intermediate code;

detecting, on basis of profile information related to a memory access for accessing target data stored in a memory, a memory access that fits an access pattern corresponding to an operating condition of a hardware prefetch function for the target data, the target data being data for which a prefetch instruction is to be inserted in advance, the prefetch instruction being an instruction for transferring data stored in the memory to a cache memory;

computing an evaluation value for the target data on basis of a length of successive memory accesses that fit the access pattern;

determining, on basis of the evaluation value, whether to suppress insertion of a prefetch instruction for the target data;

updating the intermediate code on basis of a result of the determination; and converting the updated intermediate code into a machine language program.

12. The non-transitory computer-readable recording medium according to claim 11, wherein the computer computes the evaluation value on basis of an occurrence frequency of the successive memory accesses for each length of the successive memory accesses.

13. The non-transitory computer-readable recording medium according to claim 11, wherein the memory access that fits the access pattern is such that a destination shift amount is smaller than two lines when a cache line of the cache memory is used as a unit of access, the destination shift amount being an amount of difference between a current access destination and a previous access destination.

14. The non-transitory computer-readable recording medium according to claim 11, wherein
the memory access that fits the access pattern is such that an access destination changes in either one direction of an ascending order and a descending order at a certain access width.

15. The non-transitory computer-readable recording medium according to claim 11, wherein
the profile information includes an index and address information, the index indicating an access order of each piece of data in the target data, the address information indicating an access destination, and
the computer generates object code for causing a processor to output the profile information for the target data, the processor executing the source program.

* * * * *